(12) United States Patent
Norton et al.

(10) Patent No.: US 10,022,011 B2
(45) Date of Patent: Jul. 17, 2018

(54) SYSTEM OF BEVERAGE PREPARATION MACHINE WITH BEVERAGE CARTRIDGE

(71) Applicant: Koninklijke Douwe Egberts B.V., Utrecht (NL)

(72) Inventors: Mark Norton, Randolph, NJ (US); Andrew Halliday, Shipston-on-Stour (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 15/167,602

(22) Filed: May 27, 2016

(65) Prior Publication Data

US 2016/0270585 A1    Sep. 22, 2016

Related U.S. Application Data

(62) Division of application No. 14/130,473, filed as application No. PCT/GB2012/051776 on Jul. 24, 2012, now Pat. No. 9,375,112.

(30) Foreign Application Priority Data

Jul. 29, 2011 (GB) .................................. 1113118.2

(51) Int. Cl.
*A47J 31/40* (2006.01)
*A47J 31/36* (2006.01)
(Continued)

(52) U.S. Cl.
CPC ......... *A47J 31/407* (2013.01); *A47J 31/0668* (2013.01); *A47J 31/36* (2013.01);
(Continued)

(58) Field of Classification Search
CPC ...... A47J 31/36; A47J 31/407; A47J 31/4492; A47J 31/3695; A47J 31/0668; A47J 31/3623; A47J 31/369; B65D 85/8043
See application file for complete search history.

(56) References Cited

U.S. PATENT DOCUMENTS 4,254,694 A * 3/1981 Illy .......................... A23F 5/125
99/295
5,637,343 A    6/1997 Ryan, Jr.
(Continued)

FOREIGN PATENT DOCUMENTS

CN    1166924 A    12/1997
CN    1313065 A    9/2001
(Continued)

OTHER PUBLICATIONS

Canadian Intellectual Property Office Examination Search Report, dated Sep. 15, 2016, for Application No. 2,842,547 (3 pgs).
(Continued)

*Primary Examiner* — Anthony Weier
(74) *Attorney, Agent, or Firm* — Fitch, Even, Tabin & Flannery LLP

(57) ABSTRACT

A beverage preparation machine of the type which uses pre-packaged containers of beverage ingredients includes a cartridge recognition device for determining the type of beverage to be prepared from a cartridge inserted into the machine and a variable geometry valve located downstream of a cartridge when inserted in the machine. The valve enables preparation of beverages at a range of pressures by having at least an open position and at least one restricted flow position, and a controller for selecting an initial valve position and controlling the subsequent operation of the valve according to the determination of the type of beverage to be prepared by the cartridge recognition device.

17 Claims, 9 Drawing Sheets

(51) Int. Cl.
*A47J 31/44* (2006.01)
*B65D 85/804* (2006.01)
*A47J 31/06* (2006.01)

(52) U.S. Cl.
CPC ......... *A47J 31/369* (2013.01); *A47J 31/3623* (2013.01); *A47J 31/3695* (2013.01); *A47J 31/4492* (2013.01); *B65D 85/8043* (2013.01)

(56) References Cited

U.S. PATENT DOCUMENTS

| | | | |
|---|---|---|---|
| 5,725,898 | A | 3/1998 | Murphy |
| 5,853,788 | A | 12/1998 | Murphy |
| 6,382,083 | B2 | 5/2002 | Schmed |
| 6,962,725 | B2 | 11/2005 | McFadden, Sr. |
| 6,973,869 | B1 | 12/2005 | Lin |
| 2001/0022138 | A1 | 9/2001 | Schmed |
| 2002/0187241 | A1 | 12/2002 | Young |
| 2004/0052917 | A1 | 3/2004 | Yuzawa |
| 2005/0163907 | A1 | 7/2005 | Young |
| 2005/0183578 | A1 | 8/2005 | Mandralis |
| 2009/0324791 | A1 | 12/2009 | Ohresser |
| 2010/0028495 | A1 | 2/2010 | Novak |
| 2012/0021108 | A1 | 1/2012 | Baumann |

FOREIGN PATENT DOCUMENTS

| | | |
|---|---|---|
| CN | 1491081 A | 4/2004 |
| CN | 1656983 A | 8/2005 |
| CN | 1681425 A | 10/2005 |
| CN | 201197625 Y | 2/2009 |
| CN | 101411588 A | 4/2009 |
| CN | 101641039 A | 2/2010 |
| CN | 101687591 A | 3/2010 |
| CN | 101795575 A | 8/2010 |
| CN | 102026891 A | 4/2011 |
| DE | 3130346 A1 | 2/1983 |
| DE | 102005035149 | 2/2007 |
| EP | 0209937 A1 | 1/1987 |
| EP | 0343678 A2 | 11/1989 |
| EP | 0928561 A1 | 7/1999 |
| EP | 1440640 A2 | 7/2004 |
| EP | 1440903 A1 | 7/2004 |
| EP | 1882432 | 1/2008 |
| JP | 3087142 B2 | 9/2000 |
| JP | 2000354455 A | 12/2000 |
| JP | 2005230548 | 9/2005 |
| JP | 2005318812 A | 11/2005 |
| JP | 2006518226 | 8/2006 |
| JP | 2011519584 A | 7/2011 |
| KR | 20090039858 A | 4/2009 |
| RU | 2009106095 A | 8/2010 |
| SG | 184708 A1 | 10/2012 |
| WO | 93014643 A1 | 8/1993 |
| WO | 2004026091 A1 | 4/2004 |
| WO | 2004064584 | 8/2004 |
| WO | 2007027206 A2 | 3/2007 |
| WO | 2008012203 A1 | 1/2008 |
| WO | 2008120991 A1 | 10/2008 |
| WO | 2008148650 A1 | 12/2008 |
| WO | 2009114119 A1 | 9/2009 |
| WO | 2010137966 | 12/2010 |
| WO | 2011089048 | 7/2011 |

OTHER PUBLICATIONS

"Coffee machines: Make a perfect espresso and cappuccino Using a coffee machine—step-by-step;" Which? website; http://www.which.co.uk/home-and-garden/kitchen/guides/make-a-perfect-espresso-and-cappuccino/using-a-coffee-machine--step-by-step (2 pgs.).

"Titan Grinder Project: Particle size distributions of ground coffee;" Home-Barista.com website; http://www.home-barista.com/reviews/titan-grinder-project-particle-size-distributions-of-ground-coffee-t4203.html (10 pgs.).

"What is an ESE Coffee Pod?" Galla Coffee website; http://www.gallacoffee.co.uldcoffee-knowledge/what-is-an-ese-coffee-pod.html (2 pgs.).

English Translation of DE 102005035149 published Feb. 2007 (4 pgs.).

English Translation of EP 343678 published Nov. 1989 (10 pgs.).

European Patent Office International Search Report, dated Sep. 27, 2012 for PCT/GB2012/051776 (3 pgs.).

European Patent Office Written Opinion of the International Searching Authority for PCT/GB2012/051776 (5 pgs.).

Examination Report for Chinese Application No. 2012800360434 (2 pgs.).

Notification of the First Office Action and Search Report (and English Translation) dated May 6, 2015 for Chinese Application No. 201280036043.4 (26 pgs.).

Notification of the Second Office Action dated Oct. 11, 2015 for China Application No. 201280036043.4, with English translation (30 pgs).

Office Action for Russian Application No. 2014106351, with English translation (9 pgs.).

Official Notice of Rejection dated Sep. 8, 2015 for Japanese Patent Application No. 2014-522151, with English translation (6 pgs.).

Response to UK Intellectual Property Office Combined Search and Examination Report, dated Jun. 10, 2013 for GB1113118.2 (43 pgs.).

Response to UK Intellectual Property Office further examination report, dated Nov. 29, 2013 for GB1113118.2 (4 pgs.).

UK Intellectual Property Office further examination report, dated Jul. 1, 2013 for GB1113118.2 (4 pgs.).

UK Intellectual Property Office Notification of Grant: Patent Serial No. GB2493211, dated Dec. 20, 2013 (2 pgs.).

UK Intellectual Property Office Search and Examination Report, dated Dec. 5, 2011 for GB1113118.2 (8 pgs.).

Official Notice of Rejection, dated Apr. 4, 2014 for Japanese Patent Application No. 2014-522151, with English translation (7 pgs.).

* cited by examiner

SYSTEM OF BEVERAGE PREPARATION MACHINE WITH BEVERAGE CARTRIDGE

CROSS-REFERENCE TO RELATED APPLICATIONS

This application is a divisional of U.S. patent application Ser. No. 14/130,473, filed Mar. 25, 2014, which is a U.S. national phase application of International Application No. PCT/GB2012/051776, filed Jul. 24, 2012, which claims the benefit of United Kingdom Application No. GB1113118.2, filed Jul. 29, 2011, which are all hereby incorporated herein by reference in their entireties.

FIELD

The present disclosure relates to a method and a system for making a beverage, and a beverage cartridge. In particular, it relates to methods, systems and cartridges for making coffee-based beverages.

BACKGROUND

It is well known to make coffee-based beverages by extraction of roasted ground coffee with an aqueous medium such as water. Typically, the water temperature required to produce a consumer-acceptable beverage is greater than 85° C. Beverage preparation machines have been produced that make coffee-based beverages from beverage cartridges (also known as pods or capsules) containing roasted ground coffee. Typically such beverage cartridges which are designed to produce a single serving of beverage contain up to 7 g of roasted ground coffee having a dry Helos particle size distribution of 320 to 480 microns. Such beverage preparation machines typically heat water to a temperature greater than 85° C. and pump the water through an extraction chamber in the beverage cartridge.

It is also known to produce coffee-based beverages 25 using unheated water at ambient room temperature (typically 20 to 25° C.) via a process called "cold-press." This requires steeping roasted ground coffee for an extended period of time of at least 3 hours, and preferably 6 to 8 hours, in unheated water. The time required to produce a beverage in this manner makes the process unsuitable for on-demand beverage delivery.

BRIEF SUMMARY OF THE DISCLOSURE

According to the present disclosure there is provided a method of delivering a beverage comprising the steps of:

at least partially filling an extraction chamber with roasted ground coffee;

passing an aqueous medium through the extraction chamber to form the beverage; and discharging the beverage from the extraction chamber;

wherein the roasted ground coffee has a dry Helos particle size distribution D50 of less than or equal to 200 microns;

wherein the aqueous medium has a temperature of 1° C. to 40° C.; and wherein the flow rate of the aqueous medium through the extraction chamber is 0.5 to 5 mls$^{-1}$.

It has been surprisingly found that using very finely ground roasted ground coffee having a dry Helos particle size distribution D50 of less than or equal to 200 microns allows a consumer-acceptable beverage to be produced using an aqueous medium at a temperature of 1° C. to 40° C. and with a flow rate through the extraction chamber of 0.5 to 5 mls$^{-1}$. The beverage produced has been found to possess a flavor profile that is intense, aromatic, balanced, rounded and with low acidity and low bitterness.

The surprisingly fast flow rates enabled by the method allow the production of unheated coffee-based beverages (or coffee beverages at a relatively "low" temperature of up to 40° C.) on demand without the need for steeping roasted ground coffee for a number of hours. For example, a typical volume of an espresso coffee is around 40 ml. The present method and system enable such a quantity of beverage to be produced using an aqueous medium at a temperature of 1° C. to 40° C. in a time of only 8 to 80 seconds.

In this specification unless otherwise required by the context, the following terms have the following meanings:

"Roasted coffee" means a coffee substance that has been produced by the roasting of green coffee beans. The substance may be in the form of a roasted coffee bean or in some other form produced by onward processing steps such as grinding, decaffeination, pressing, etc. Particular examples of roasted coffee include roasted coffee beans, roasted expeller cake, roasted and flaked coffee.

"Roasted ground coffee" means a roasted coffee substance that has been subject to a comminution process in order to reduce the particle size of the original roasted coffee substance. Again, unless otherwise required by the context the comminution process may include one or more of grinding, chopping, pounding and crushing.

"Helos particle size distribution D50", means the 50$^{th}$ percentile figure by volume of the particle size distribution, as obtained from a Helos™ laser light diffraction particle size analyzer available from Sympatec, Clausthal-Zellerfeld, Germany. That is, the D50 is a value on the distribution such that 50% by volume of the particles have a characteristic size of this value or less. The dry Helos particle size distribution is measured using a HELOS Hi197, R6 Lens, RODOS/M Dispersing System and VIBRI Feeder manufactured by Sympatec GmbH.

The HELOS is setup with an R6 lens and the following trigger parameters:

Start: Optical concentration>=1% (start the data acquisition once this condition occurs)

Valid: Always

Stop: 2 s at optical concentration<=1% or after 99 s (stop data acquisition if either of those conditions occur)

Time base: 100 ms

The dispersion method using the RODOS (pressurised air stream) and VIBRI (vibrating vessel with controlled outlet geometry) is:

Pressure: 3.00 bar

Depression: 93.00 mbar

Revolution: 0%

Feeder: VIBRI

Feed rate: 100%

Gap Height: 4.0 mm

"Brew weight" means the weight of the brewed beverage received in the receptacle after dispensation has completed.

"Fill weight" means the dry weight of roasted ground coffee within the extraction chamber.

"Free-flow density" means the density of the roasted ground coffee measured by pouring the roasted ground coffee under gravity into a container of known volume to fill the known volume without tamping, compaction, vibration or the like and calculating the density by dividing the mass of the roasted ground coffee contained by the volume of the container.

"Free-flow volume" means the volume occupied by the roasted ground coffee when under free-flow conditions and is calculated by multiplying the free-flow density of the roasted ground coffee by the mass of the roasted ground coffee.

"Fill ratio" means the ratio of the free-flow volume of the roasted ground coffee within the extraction chamber to the volume of the extraction chamber.

"Soluble solids" means the percentage soluble solids as measured by a Kyoto Density/Specific Gravity Meter DA-520 manufactured by Kyoto Electronics Manufacturing Co. Ltd., of Kyoto, Japan, using the following set-up parameters:

Calculation Parameters:

| Result: | Conc. |
|---|---|
| Conc. Units: | % |
| Conc. Formula: | A + Bx + Cxx |
| ParameterSet: | Coe+. |
| Data Replace: | x <--d |
| Parameters: | A: 2.966410E+2 |
| | B: −8.424274E+2 |
| | C: 5.461975E+2 |

Measurement Parameters:

| Temperature: | 20° C. |
|---|---|
| Stability: | 1 |
| Limit Time: | 600 s |
| Sequence: | On |
| Sampling Seq.: | Set |
| Sampling Time: | 10 s |
| Drain Seq.: | Set |
| Drain Time: | 10 s |
| Rinse-1 Seq.: | Set |
| Rinse-1 Time: | 30 s |
| Rinse-2 Seq.: | Set |
| Rinse-2 Time: | 15 s |
| Purge Seq.: | Set |
| Purge Time: | 120 s |
| Cell Test: | off |
| Calib.: | Air&Water |

"Grinder setting" means the grinder setting (e.g. 0, 2, 4, 6, 8) on a Dalla Corte® coffee grinder model K30 available from Dalla Corte of Baranzate, Italy.

The aqueous medium used in the method may be water.

The roasted ground coffee preferably has a dry Helos particle size distribution D50 of less than or equal to 150 microns, more preferably less than or equal to 100 microns. The dry Helos particle size distribution D50 in one example may be approximately 60 microns.

The aqueous medium may have a temperature of 1° C. to 25° C. In one example the temperature may be 15° C. to 25° C. In another example the temperature may be 20° C. to 25° C. Advantageously the aqueous medium for the method does not require any heating prior to extraction. In other words the aqueous medium may be used at its ambient temperature. This reduces significantly the energy requirement for producing the beverage. The aqueous medium may be actively chilled prior to extraction if desired.

The flow rate of the aqueous medium through the extraction chamber may be 1 to 3 $mls^{-1}$. In one example the flow rate may be approximately 2 $mls^{-1}$. In another example the flow rate may be approximately 1 $mls{-1}$.

The quantity of roasted ground coffee in the extraction chamber may be 9 g or greater. In one example the quantity of roasted ground coffee in the extraction chamber may be 9 g to 13 g. In another example the quantity of roasted ground coffee in the extraction chamber may be 10 g to 13 g. These quantities are intended for producing a single serving of the beverage. The method may also be used with larger quantities of roasted ground coffee where multiple servings (e.g. a carafe) are to be discharged.

The fill ratio of the extraction chamber may be greater than 80%. In one example the fill ratio may be greater than 100%. In another example the fill ratio may be 80% to 150%. Fill ratios in excess of 100% are enabled by compaction of the roasted ground coffee during filling.

Preferably the soluble solids in the beverage is greater than 4%.

The pressure in the extraction chamber during extraction may be 4 to 20 bar (0.4 to 2 MPa).

The beverage may be coffee. Alternatively, the beverage may be coffee-based and contain one or more additional components. The beverage may be foamed during discharge and/or have a crema formed thereon by passing the beverage through an eductor as taught in EP1440639.

The present disclosure also provides a system for making a beverage comprising a beverage preparation machine and a beverage cartridge;

wherein the beverage cartridge comprises an extraction chamber containing roasted ground coffee having a dry Helos particle size distribution D50 of less than or equal to 200 microns; and wherein the beverage preparation machine comprises a source of an aqueous medium, a pump and a controller, the controller being programmed to pump the aqueous medium through the extraction chamber of the beverage cartridge at a flow rate of 0.5 to 5 $mls^{-1}$ and at a temperature of 1° C. to 40° C. to form the beverage.

The roasted ground coffee in the beverage cartridge may have a dry Helos particle size distribution D50 of less than or equal to 150 microns, preferably less than or equal to 100 microns. The dry Helos particle size distribution D50 in one example may be approximately 60 microns.

The aqueous medium may be pumped at a temperature of 1° C. to 25° C. In one example the temperature may be 15° C. to 25° C. In another example, the temperature may be 20° C. to 25° C.

The aqueous medium may be pumped at a flow rate of 1 to 3 $mls^{-1}$. In one example it may be pumped at approximately 2 $mls^{-1}$.

The quantity of roasted ground coffee in the extraction chamber of the beverage cartridge may be 9 g or greater. In one example the quantity of roasted ground coffee in the extraction chamber is 9 g to 13 g. In another example the amount is 10 g to 13 g.

The fill ratio of the extraction chamber may be greater than 80%. In one example the fill ratio may be greater than 100%. In another example the fill ratio may be 80% to 150%.

The beverage preparation machine may comprises a valve for setting an extraction pressure experienced during extraction in the extraction chamber of the beverage cartridge and wherein the controller is programmed to operate the valve to set the extraction pressure at 4 to 20 bar (0.4 to 2 MPa).

The valve may be located downstream of the beverage cartridge.

The present disclosure further provides a beverage cartridge for use in a system as described above comprising an extraction chamber containing 9 g or greater of roasted ground coffee having a dry Helos particle size distribution D50 of less than or equal to 200 microns.

The beverage cartridge may further comprise a code readable by the beverage preparation machine, wherein the code may instruct the controller of the beverage preparation machine to pump an aqueous medium through the extraction chamber of the beverage cartridge at a flow rate of 0.5 to 5 mls$^{-1}$ and at a temperature of 1° C. to 40° C. to form a beverage.

BRIEF DESCRIPTION OF THE DRAWINGS

Examples of the present disclosure will now be described, by way of example only, with reference to the accompanying drawings, in which.

DETAILED DESCRIPTION

Figure 1:
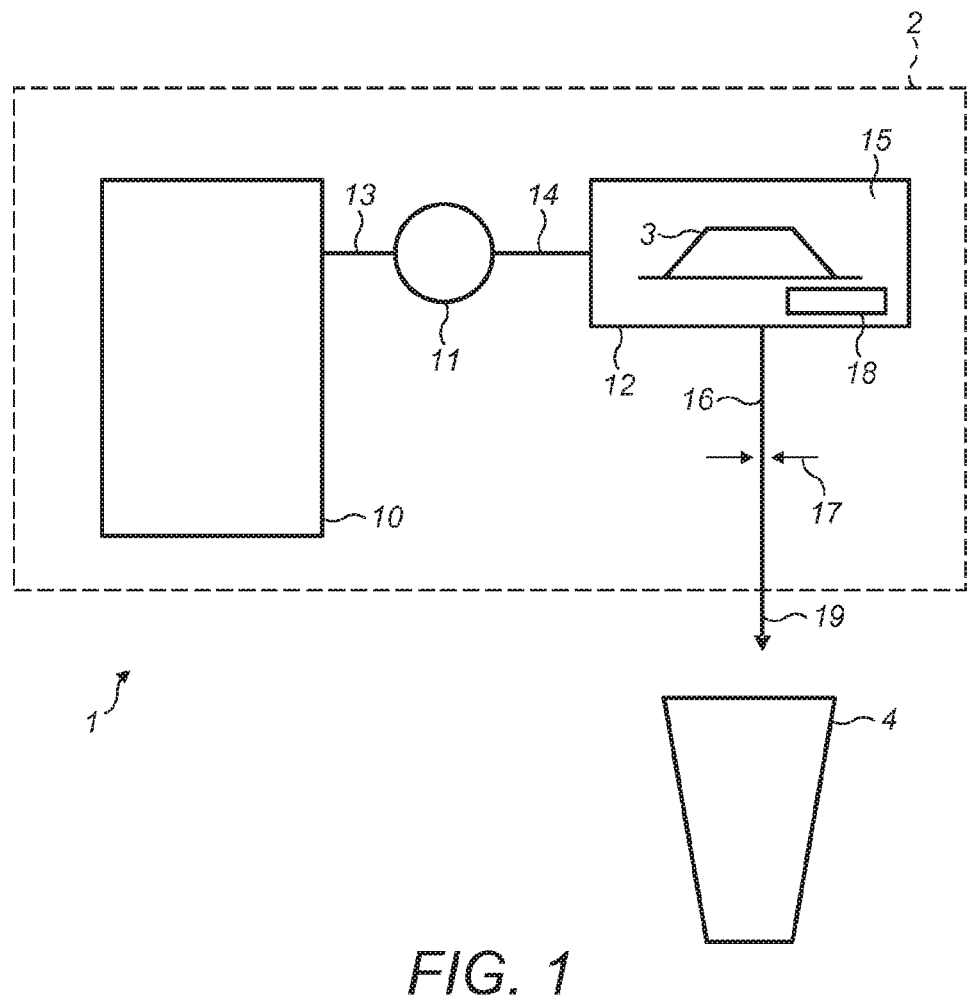
FIG. 1 is a schematic illustration of a beverage preparation machine and beverage cartridge according to the present disclosure.

FIG. 1 illustrates an example of a system according to the present disclosure. The system 1 comprises a beverage preparation machine 2 and a beverage cartridge 3 which contains roasted ground coffee.

The beverage preparation machine 2 comprises a reservoir 10, a pump 11 and a brew head 12.

The reservoir 10 contains, in use, an aqueous medium such as water. The reservoir 10 may be manually fillable or plumbed in to a mains supply of water for automatic refilling. The reservoir 10 is connected to the pump 11 by a suitable conduit such as a pipe 13.

The pump 11, in use, pumps water from the reservoir 10 to the brew head 12 via a suitable conduit such as a pipe 14.

The beverage cartridge 3 contains the roasted ground coffee within a closed chamber which forms an extraction chamber of the system. The beverage cartridge 3 is closed prior to use to maintain the freshness of the roasted ground coffee and is preferably pierced by the beverage preparation machine during use. An example of a suitable beverage cartridge is described in EP1440903. However other types of beverage cartridge may be used.

The brew head 12 comprises a chamber 15 for receiving the beverage cartridge 3, an inlet mechanism for piercing an inlet in the beverage cartridge 3 and directing the water from pipe 14 into the beverage cartridge 3, and an outlet mechanism for piercing an outlet in the beverage cartridge 3 and directing beverage formed from the water and the roasted ground coffee into an outlet conduit which may be in the form of flexible tubing 16. A variable valve 17 is positioned below the location of the beverage cartridge 3 and operable on the flexible tubing 16 to alter the back pressure experienced during use in the brew head 12. The variable valve 17 may be a pinch valve where the distance between the pinching elements can be varied to effectively vary the cross-sectional flow area of the flexible tubing 16. The outlet of the variable valve 17 leads to the outlet 19 of the machine where the beverage is dischargeable into a receptacle 4, such as a cup, mug or carafe.

The brew head 12 further comprises a barcode reader 18 which, in use reads a barcode provided on the beverage cartridge 3 to determine certain brew parameters, for example the volume of beverage to be dispensed and the flow rate of the water to be pumped.

A controller (not shown) controls operation of the pump 11, variable valve 17 and barcode reader 18. The beverage preparation machine 2 may comprise other components which have been omitted from FIG. 1 for clarity. For example, a flow meter may be provided to determine the quantity of water pumped to the brew head 12.

It is to be noted that the beverage preparation machine 2 does not require a water heater for operation as the water in the reservoir 10 is preferably at ambient temperature or previously chilled below ambient temperature.

The basic steps of operation of the method comprise:
a) filling an extraction chamber with roasted ground coffee;
b) passing an aqueous medium through the extraction chamber to form the beverage; and
c) discharging the beverage from the extraction chamber.

Figure 2:
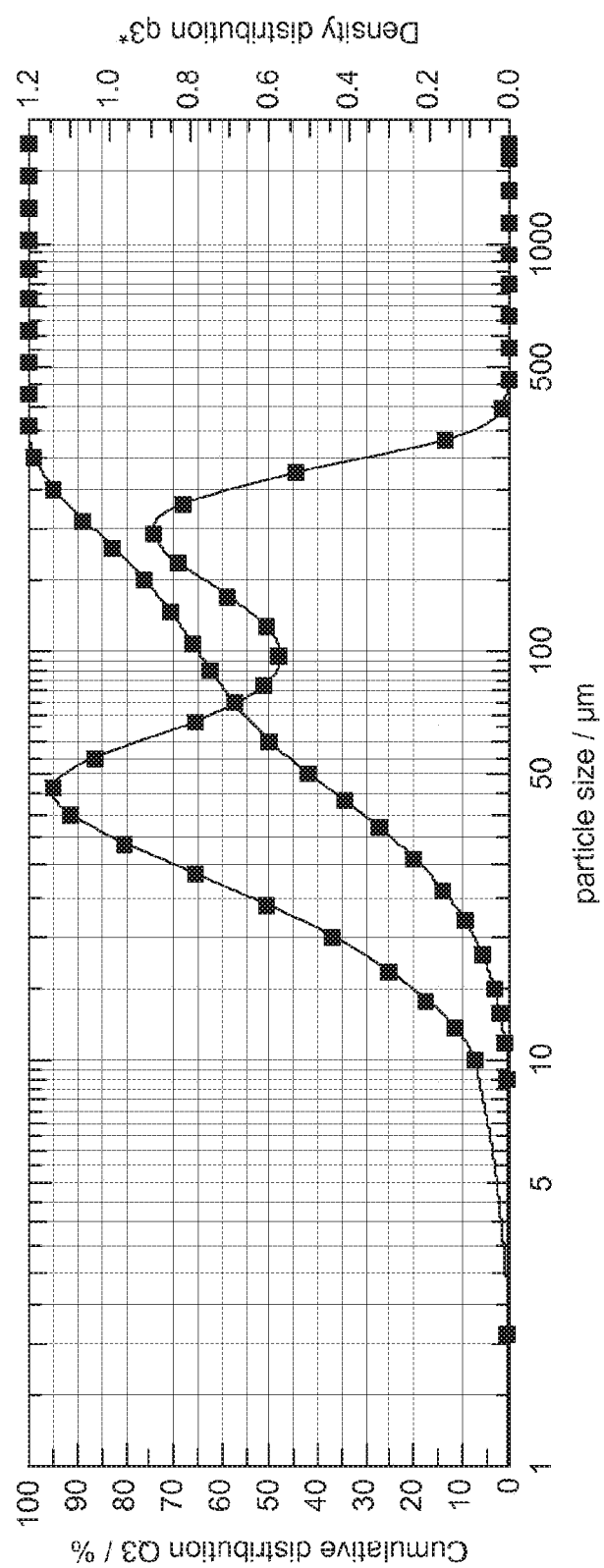
FIG. 2 is a graph showing a particle size distribution for a first grind of roasted ground coffee.

The roasted ground coffee in the beverage cartridge has a dry Helos particle size distribution D50 of less than or equal to 200 microns. The roasted ground coffee may be produced by grinding roasted coffee beans using a coffee grinder. The particle size distribution for one sample at grinder setting 0 is shown in FIG. 2. The x-axis of FIG. 2 shows the particle size in microns. The left-hand y-axis shows the cumulative distribution $Q_3$ as a percentage. The right-hand y-axis shows the density distribution q31g. The dry Helos particle size distribution D50 for FIG. 2 is 60.88 microns.

Figure 3:
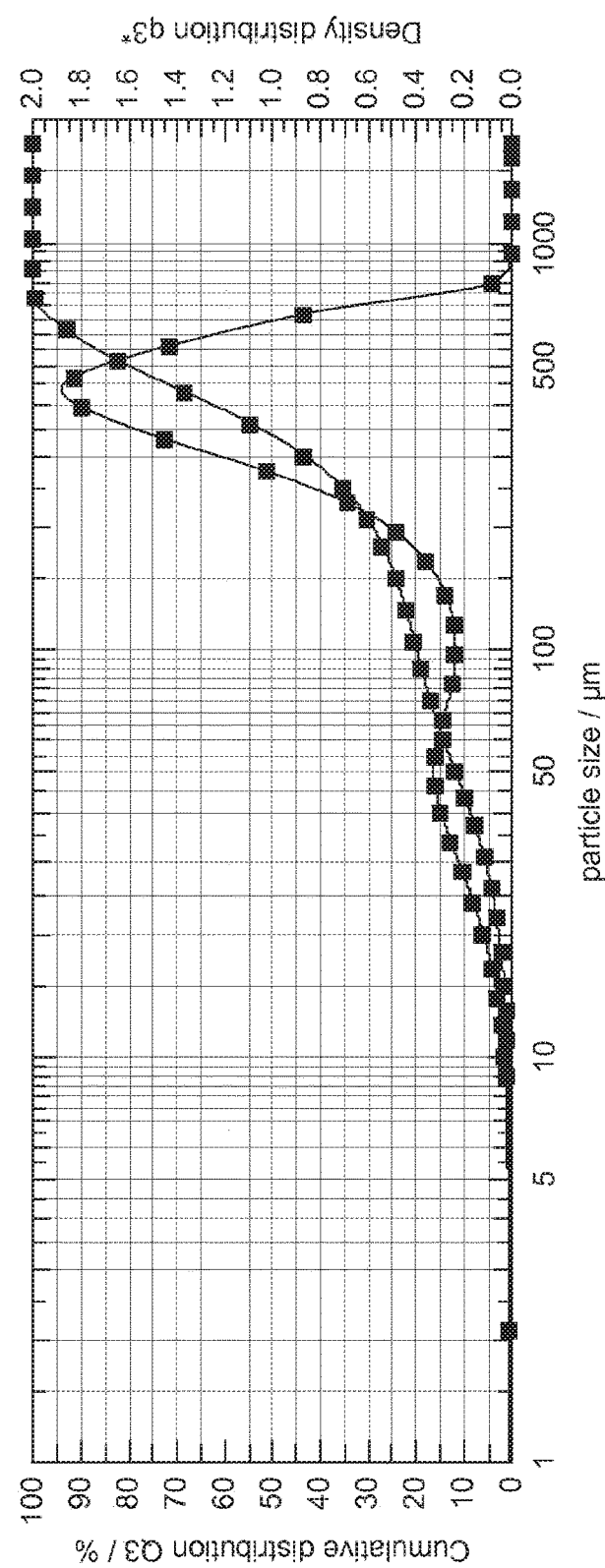
FIG. 3 is a graph showing a particle size distribution for a second grind of roasted ground coffee.

The particle size distribution for one sample at grinder setting 8 is shown in FIG. 3. The x- and y-axes are as above. The dry Helos particle size distribution D50 for FIG. 3 is 335.99 microns.

Three samples at each of grinder settings 0, 2, 4, 6 and 8 were measured by the Helos equipment with the results shown in Table 1:

TABLE 1

|  | Grinder setting | | | | |
| --- | --- | --- | --- | --- | --- |
|  | 0 | 2 | 4 | 6 | 8 |
| $D_{50}$ (sample 1) μm | 60.96 | 109.34 | 189.41 | 265.57 | 335.99 |
| $D_{50}$ (sample 2) μm | 60.88 | 109.74 | 188.39 | 265.52 | 336.94 |
| $D_{50}$ (sample 3) μm | 61.38 | 111.44 | 191.13 | 264.11 | 335.3 |
| $D_{50}$ (AVERAGE) μm | 61.07 | 110.17 | 189.64 | 265.07 | 336.08 |

Where pre-packaged beverage cartridges are used, the filling of the extraction chamber is carried out during manufacture of the beverage cartridge 3.

The use of very finely ground roasted ground coffee allows a greater weight of roasted ground coffee to be filled into a specific volume with or without compression of the roasted ground coffee. For example, a beverage cartridge 10 of the type shown in FIG. 18 of EP1440903 and commercially available under the trade name Tassimo® Kenco® Medium Roast T-Disc®, from Kraft Foods UK Ltd., typically has an extraction chamber volume of 28 cm³ and a fill weight of approximately 7 g of roasted ground coffee with a dry Helos particle size distribution D50 of around 320 to 480 microns. The fine grinds of the present disclosure allow the T-Disc® extraction chamber to contain a fill weight of 9 to 13 g.

For example, for roasted coffee ground at grinder setting 0 the free-flow density of the roasted ground coffee was at least 0.37 gcm$^{-3}$ (at this grinder setting measurement of the free-flow density may not avoid inclusion of some air pockets within the measuring container resulting in the density result being a lower limit on the actual density) As shown in Table 2 below, when filled into a T-Disc® extraction chamber of volume 28 cm$^3$ the following fill ratios were obtained:

TABLE 2

| Fill Weight (g) | Compaction (%) | Headspace (cm$^3$) | Filling Ratio (%) |
|---|---|---|---|
| 13 | 25.0 | 0.0 | 125 |
| 12 | 15.4 | 0.0 | 115 |
| 11 | 5.8 | 0.0 | 106 |
| 10.4 | 0.0 | 0.0 | 100 |
| 10 | 0.0 | 1.1 | 96 |
| 9 | 0.0 | 3.8 | 87 |
| 8 | 0.0 | 6.5 | 77 |
| 7 | 0.0 | 9.2 | 67 |

It is to be noted that the extraction chamber may be substantially fully filled with 0.4 g of roasted ground coffee ground at grinder setting 0 under free-flow conditions without any compaction. Higher fill ratios are achievable by use of compaction, vibration, etc.

In another example, for roasted coffee ground at grinder setting 8 the free-flow density of the roasted ground coffee was 0.32 gcm$^{-3}$. As shown in Table 3 below, when filled into a T-Disc® extraction chamber of volume 28 cm$^3$ the following fill ratios were obtained:

TABLE 3

| Fill weight (g) | Compaction (%) | Headspace (cm$^3$) | Filling Ratio (%) |
|---|---|---|---|
| 13 | 46.6 | 0.0 | 147 |
| 12 | 35.3 | 0.0 | 135 |
| 11 | 24.1 | 0.0 | 124 |
| 10 | 12.8 | 0.0 | 113 |
| 9 | 1.5 | 0.0 | 102 |
| 8.9 | 0.0 | 0.0 | 100 |
| 8 | 0.0 | 2.7 | 90 |
| 7 | 0.0 | 5.9 | 79 |

Here, the extraction chamber was filled under free-flow conditions by 8.9 g of roasted ground coffee. Again, higher fill ratios may be obtained using compaction, etc.

The water in the reservoir 10 may have a temperature of 1° C. to 40° C. At temperatures below 1° C. the water will freeze and not be usable. As shown below, it has been found that temperatures of no more than 40° C. provide beneficial results. The water may be at ambient temperature—that is at the temperature of the beverage preparation machines local environment. For a typical setting of the machine in a domestic house or a retail shop ambient temperature may typically be 20 to 25° C.

The water is pumped through the extraction chamber of the beverage cartridge 3 at a flow rate of 0.5 to 5 mls$^{-1}$.

Table 4 illustrates the effect of changing the fill weight of the extraction chamber. For all samples in Table 4 the roasted coffee beans were ground at grinder setting 0 and filled into a Tassimo® Kenco® Espresso T-Disc® with an extraction chamber volume of 28 cm$^3$; the flow rate was 1 mls$^{-1}$ and the variable valve 17 was set to achieve a back pressure within the extraction chamber of 6 bar.

TABLE 4

| Fill weight (g) | Temp. (° C.) | Brew weight (g) | Comments | Soluble solids (%) |
|---|---|---|---|---|
| 13 | 21 | 42.0 | Good | 6.03 |
| 13 | 21 | 43.8 | Good | 5.72 |
| 12 | 21 | 42.0 | Good | 5.34 |
| 12 | 22 | 43.8 | Good | 3.89 |
| 11 | 22 | 43.0 | Good | 4.33 |
| 11 | 22 | 42.1 | Good | 4.88 |
| 10 | 22 | 43.0 | Good | 4.28 |
| 10 | 22 | 42.4 | Good | 4.36 |
| 9 | 22 | 40.9 | Acceptable | 4.48 |
| 9 | 22 | 41.0 | Acceptable | 4.36 |
| 8 | 22 | 40.2 | Not Acceptable | 3.80 |
| 8 | 22 | 41.3 | Not Acceptable | 3.79 |
| 7 | 22 | 39.7 | Not Acceptable | 3.35 |
| 7 | 22 | 40.6 | Not Acceptable | 2.78 |

Samples which were rated "Good" had good visual extraction that was attractive to samplers and a good or great taste and flavour according to samplers. Samples which were rated "Acceptable" had an acceptable taste and flavor according to samplers but the visual appearance of the extraction was less good than those samples rated "Good". Samples rated "Not Acceptable" had a weak and/or bitter taste according to samplers.

Figure 4:
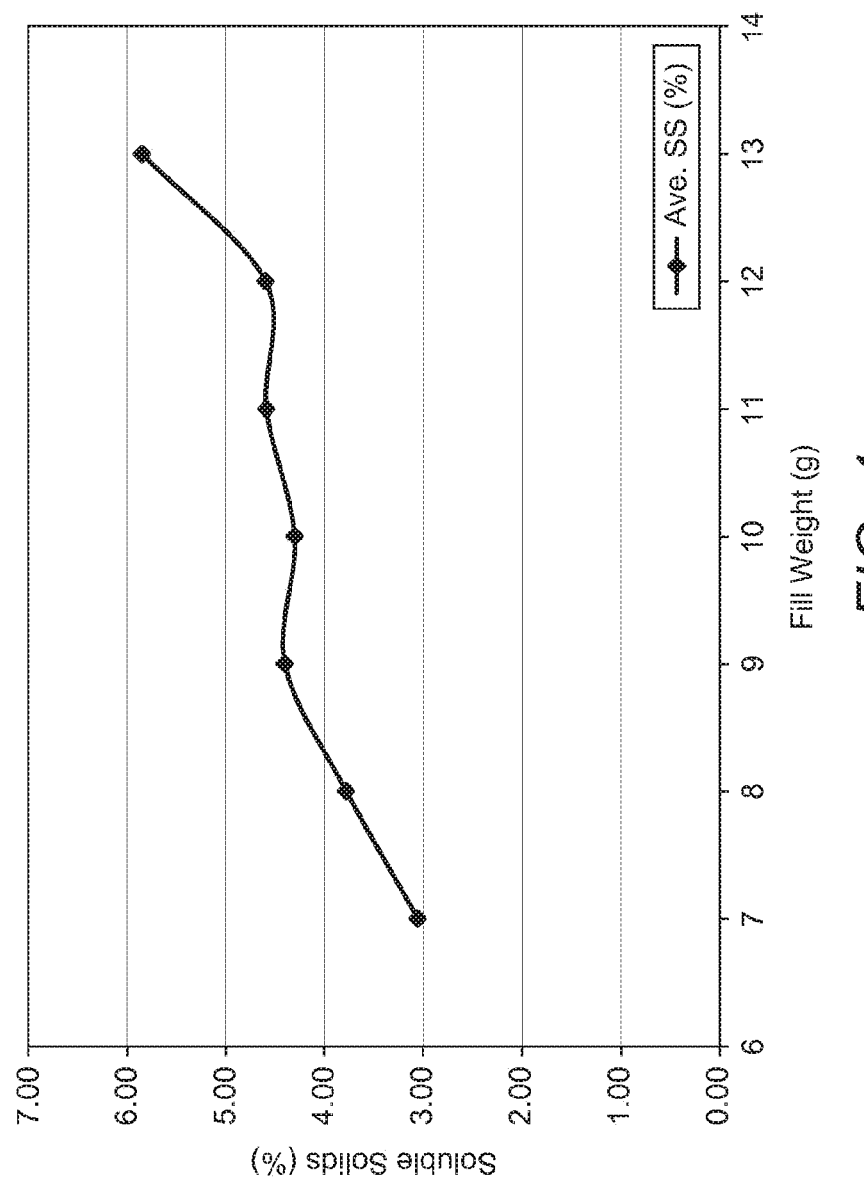
FIG. 4 is a graph of percentage soluble solids versus fill weight.

FIG. 4 plots the averaged percentage soluble solids at each sampled fill weight.

As can be seen, "Good" and "Acceptable" beverages were obtained according to the present method wherein the percentage soluble solids were greater than 4%, this being achieved where the fill weight was 9 g or greater.

Table 5 illustrates the effect of varying the grind size of the roasted ground coffee. For all samples in Table 5 the fill weight of the extraction chamber in the Tassimo® Kenco® Espresso T-Disc® with an extraction chamber volume of 28 cm$^3$ was 12 g; the flow rate was 1 mls$^{-1}$, the water temperature was 21° C. and the variable valve 17 was set to achieve a back pressure within the extraction chamber of 6 bar.

TABLE 5

| Grind setting | Brew weight (g) | Comments | Soluble solids (%) |
|---|---|---|---|
| 0 | 44 | Good | 5.24 |
| 0 | 45 | Good | 5.30 |
| 2 | 44 | Good | 4.16 |
| 2 | 44 | Good | 5.39 |
| 4 | 44 | Acceptable | 4.83 |
| 4 | 45 | Acceptable | 4.82 |
| 6 | 45 | Not Acceptable | 3.91 |
| 6 | 45 | Not Acceptable | 4.12 |
| 8 | 46 | Not Acceptable | 3.22 |
| 8 | 45 | Not Acceptable | 3.56 |

Samples which were rated "Good" had a good or great taste according to samplers. Samples which were rated "Acceptable" had an acceptable taste according to samplers. Samples rated "Not Acceptable" had a weak taste according to samplers.

Figure 5:
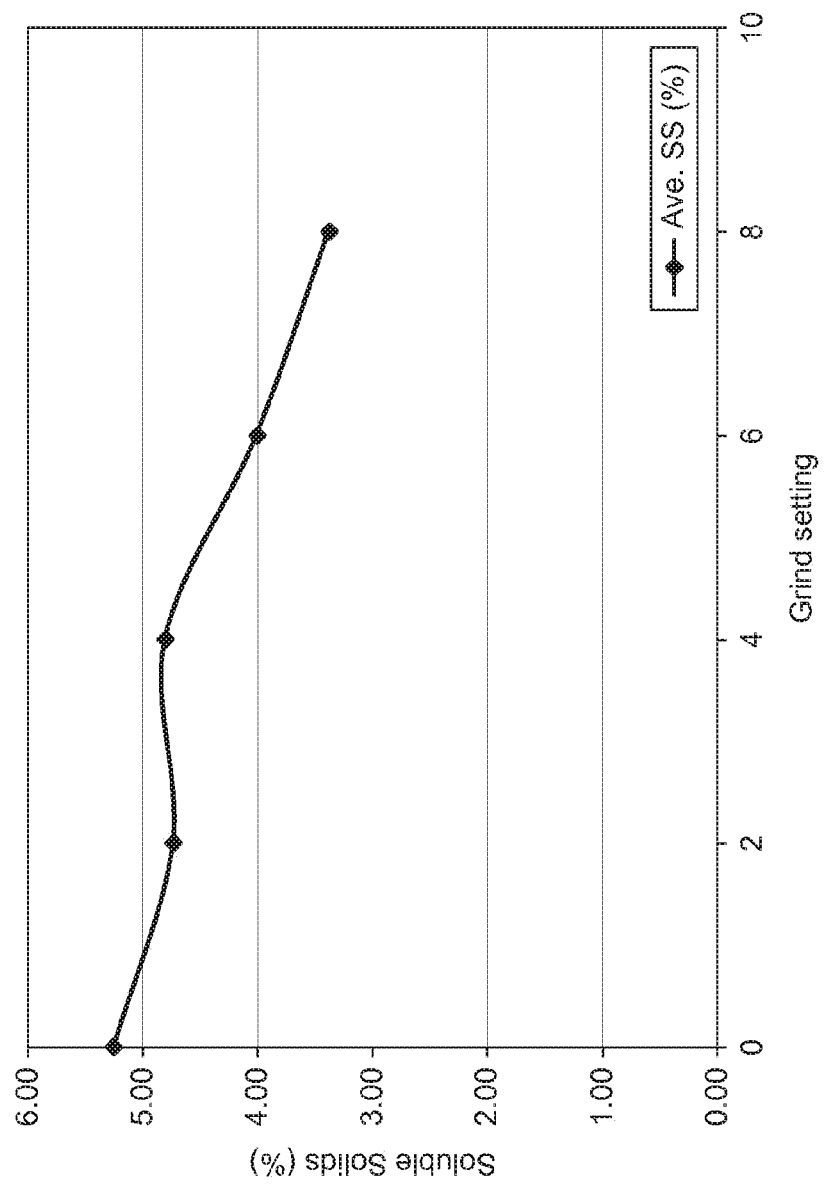
FIG. 5 is a graph of percentage soluble solids versus grind setting.

FIG. 5 plots the averaged percentage solids at each grinder setting.

As can be seen, "Good" and "Acceptable" beverages were obtained according to the present method wherein the percentage soluble solids were greater than 4%, this being achieved where the grinder setting was 4 or lower (which equates from Table 1 to a dry Helos particle size distribution D50 of around 180 to 200 microns or lower)

Table 6 illustrates the effect of varying the water temperature. For all samples in Table 6 the grinder setting was 0, the fill weight in the extraction chamber of the Tassimo® Kenco® Espresso T-Disc® with an extraction chamber volume of 28 cm3 was 13 g, the flow rate 1 mls$^{-1}$ and the variable valve 17 was set to achieve a back pressure within the extraction chamber of 6 bar.

TABLE 6

| Temp. (° C.) | Brew weight (g) | Comments |
| --- | --- | --- |
| 21 | 43 | Good |
| 40 | 40 | Good |
| 60 | 40 | Not acceptable 10 |
| 80 | na | Not acceptable |
| 90 | na | n/a due to rupture of T-disc ® |

Samples which were rated "Good" had a strong visual extraction and an intense taste according to samplers. Samples rated "Not Acceptable" had a taste that was too strong and bitter according to samplers. The sample at 90° C. failed due to overpressure developed in the extraction chamber.

As can be seen, good beverages were obtained with a water temperature up to 40° C. However, operation of the method without heating of the water prior to use is preferred as it leads to lower energy requirements for each beverage. In addition, a simpler beverage reparation machine may be utilised that does not contain a heater.

Figure 6:
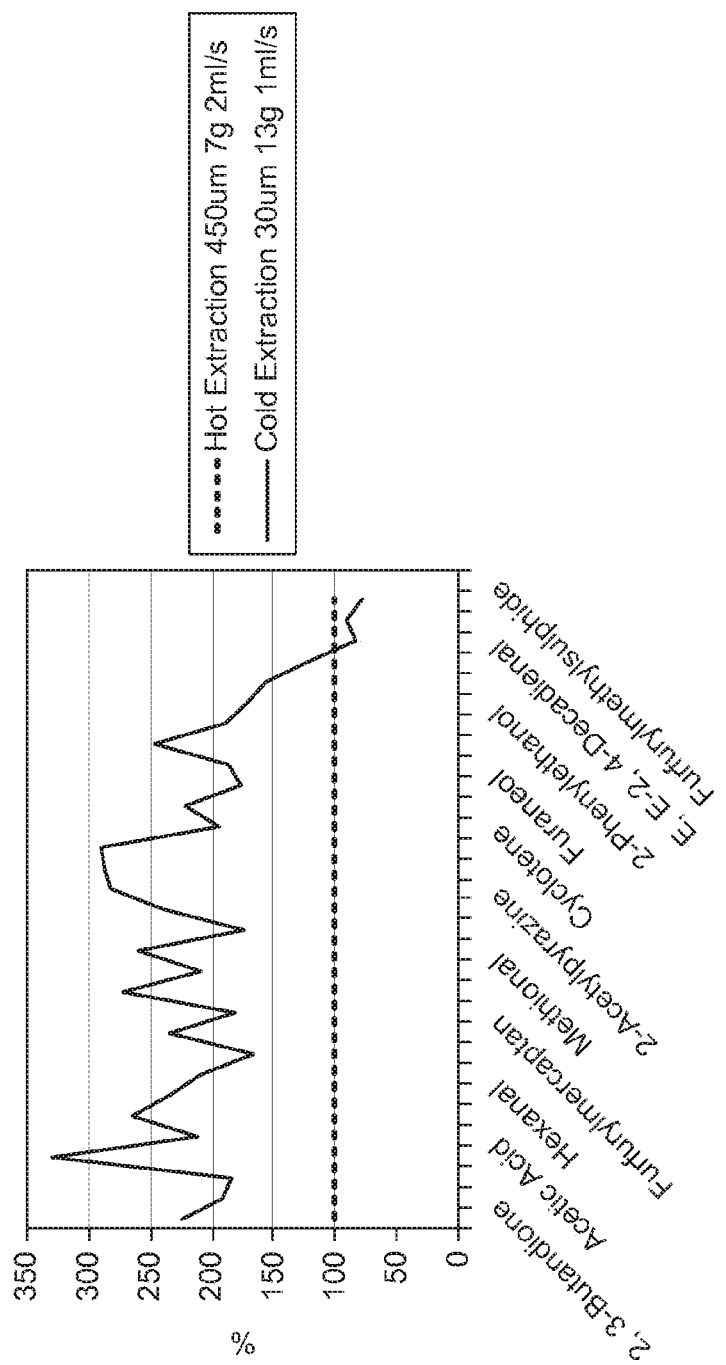
FIGS. 6 to 8 are aromatic compound profiles.

It has also been surprisingly found that the beverages obtained according to the methods of the present disclosure have an enhanced aroma profile (as measured by the quantities of aromatic compounds that are desirable in coffee beverages) compared to coffee beverages prepared by extraction with hot water. FIG. 6 compares the relative quantity of various aromatic compounds produced by two samples as might be consumed. The first, comparative, sample was brewed in a Tassimo® Kenco® Espresso T-Disc® with an extraction chamber volume of 28 cm$^3$, with a fill weight of the extraction chamber of 7 g of roasted ground coffee having a D50 of 450 microns; the flow rate was 2 mls$^{-1}$, the water temperature was 90° C. and the variable valve 17 was set to achieve a back pressure within the extraction chamber of 6 bar. The second sample was brewed in a Tassimo® Kenco® Espresso T-Disc® with an extraction chamber volume of 28 cm$^3$, with a fill weight of the extraction chamber of 13 g of roasted ground coffee having a D50 of 30 microns; the flow rate was 1 mls$^{-1}$, the water temperature was 22° C. and the variable valve 17 was set to achieve a back pressure within the extraction chamber of 6 bar. As can be seen from FIG. 6 enhanced quantities of nearly all of the listed compounds were achieved with the second sample.

Figure 7:
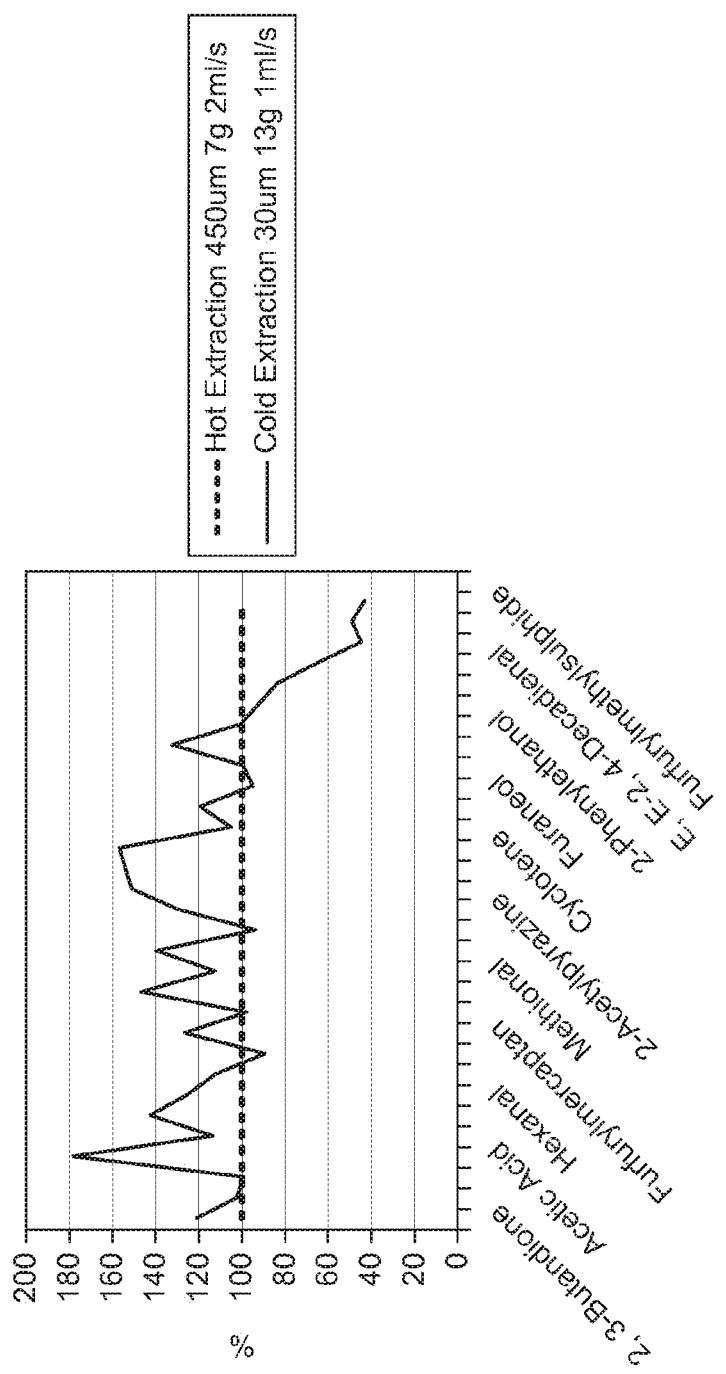

FIG. 7 plots the same data as FIG. 6 but with the quantity of the compounds normalised per gram weight of the fill weight to take into account the higher fill weight of the second sample. As can be seen, even on a per gram basis the second sample produced higher quantities of nearly all the listed compounds.

Figure 8:
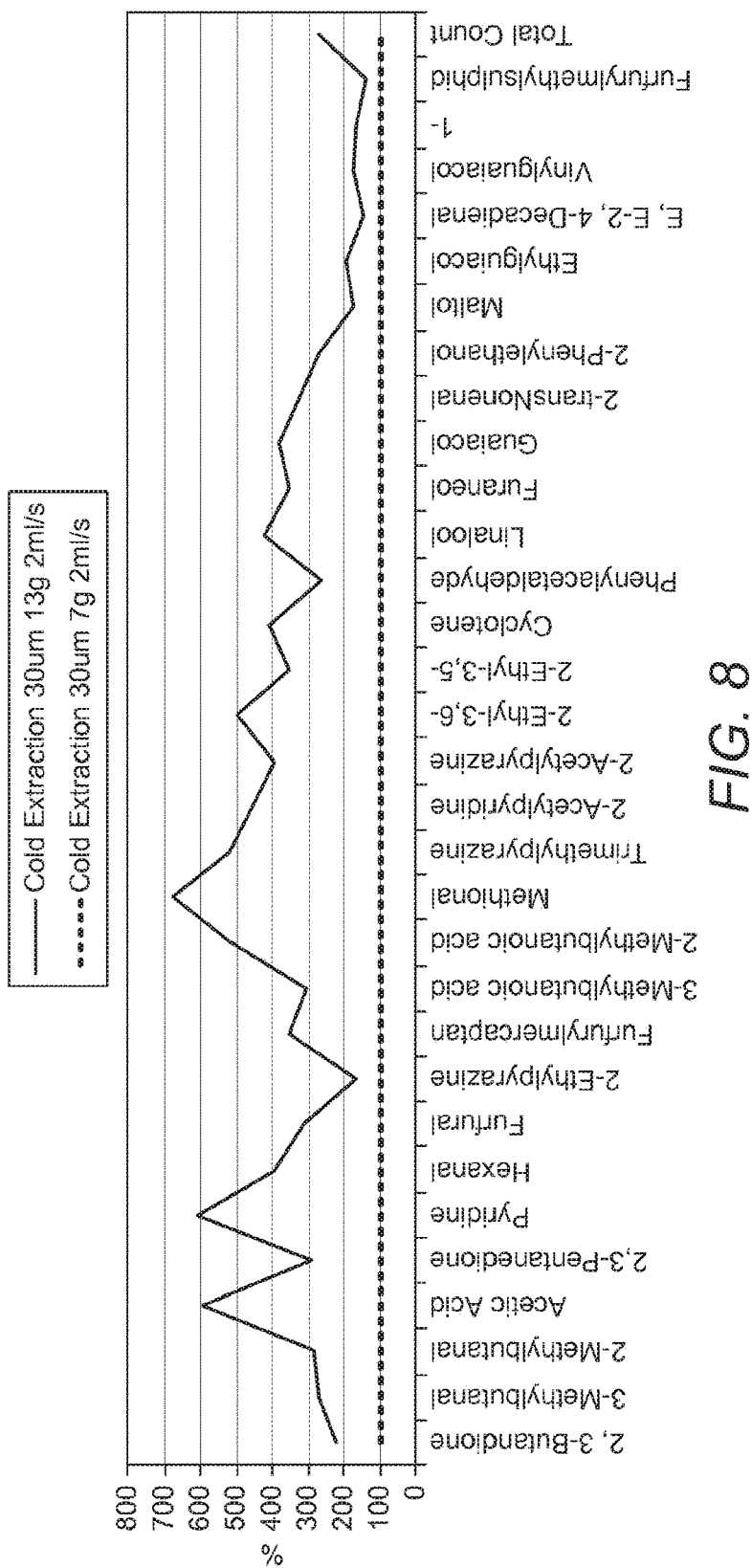

FIG. 8 compares the impact on the relative quantity of the aromatic compounds produced by varying the fill weight. The first sample was brewed in a Tassimo® Kenco® Espresso T-Disc® with an extraction chamber volume of 28 cm$^3$, with a fill weight of the extraction chamber of 7 g of roasted ground coffee having a D50 of 30 microns; the flow rate was 2 mls$^{-1}$, the water temperature was 22° C. and the variable valve 17 was set to achieve a back pressure within the extraction chamber of 6 bar. The second sample was identical except that the fill weight was 13 g. As can be seen from FIG. 8 enhanced quantities of nearly all of the listed compounds were achieved with the second sample on an absolute and per gram basis.

Figure 9:
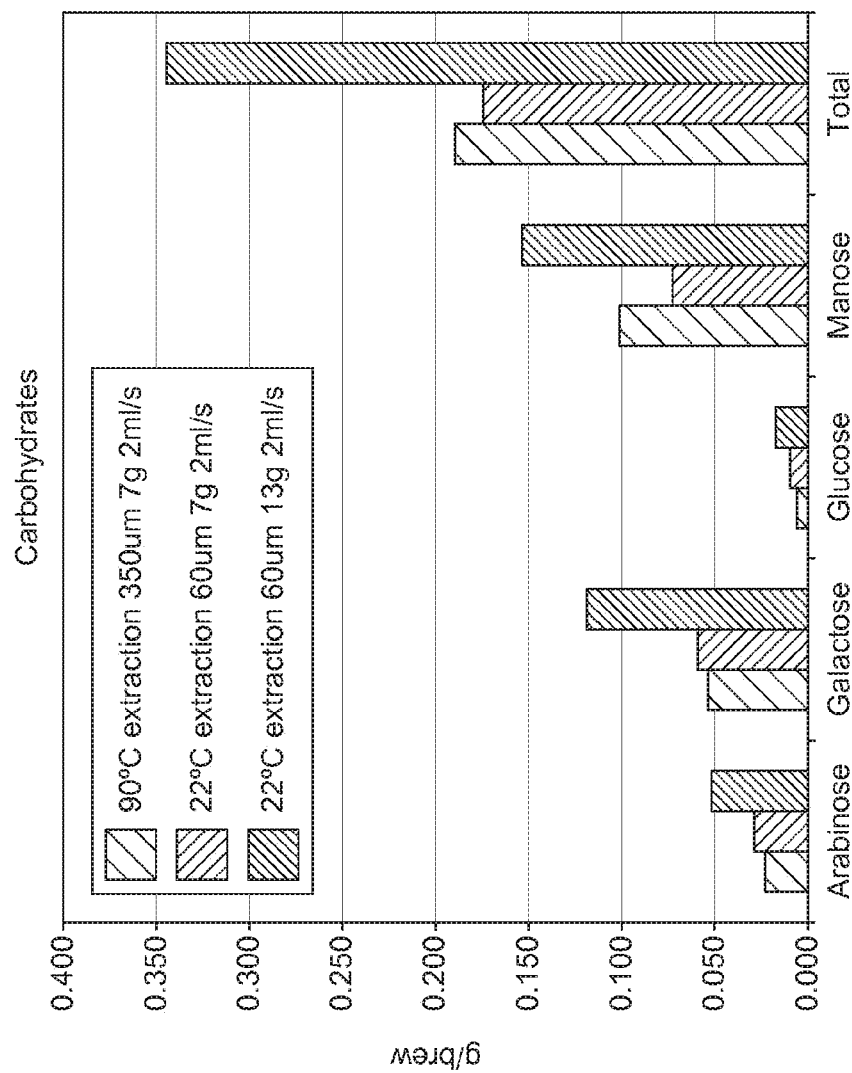
FIG. 9 is a carbohydrate profile.

It has also been surprisingly found that the beverages obtained according to the methods of the present disclosure contain an unexpectedly high level of carbohydrates. FIG. 9 compares the quantity per brew of arabinose, galactose, glucose, manose for three brew conditions. The first, comparative, sample was brewed in a Tassimo® Kenco® Espresso T-Disc® with an extraction chamber volume of 28 cm$^3$, with a fill weight of the extraction chamber of 7 g of roasted ground coffee having a D50 of 350 microns; the flow rate was 2 mls$^{-1}$, the water temperature was 90° C. and the variable valve 17 was set to achieve a back pressure within the extraction chamber of 6 bar. The second sample was brewed in a Tassimo® Kenco® Espresso T-Disc® with an extraction chamber volume of 28 cm$^3$, with a fill weight of the extraction chamber of 7 g of roasted ground coffee having a D50 of 60 microns; the flow rate was 2 mls$^{-1}$, the water temperature was 22° C. and the variable valve 17 was set to achieve a back pressure within the extraction chamber of 6 bar. The third sample was brewed under the same conditions as the second sample except that the fill weight of the extraction chamber was increased to 13 g of roasted ground coffee having a D50 of 60 microns.

In the past it has been commonly understood that extracting roasted ground coffee at a lower temperature will not fully extract carbohydrate compounds. However, using the present methods the levels of carbohydrates produced even on a per gram basis (as shown by the second sample) are similar to or, for some carbohydrates, even exceed the levels produced by hot extraction.

While in the above detailed description the system and method has been described using beverage cartridges for containing the roasted ground coffee, the disclosure is not so limited. The roasted ground coffee may, for example, be filled directly into an ingredient receptacle of a beverage preparation machine, such as an espresso group handle.

Also, while it is not necessary for the beverage preparation machine to include a water heating means the method can be used with a beverage preparation machine that has a heating means. In this case the heater is simply not utilised (where the water is to be used at ambient temperature or chilled) or is used only to heat the water up 15 to 40° C.

The beverage preparation machine may be provided with a cooling mechanism for cooling the water in the reservoir 10 to a temperature below ambient.

The beverage dispensed from the system may undergo a crema-production step to form a crema on the surface of the coffee beverage. The crema-generation step may be undertaken within the beverage cartridge by passing the beverage through an eductor as described in EP1440903 or similar constriction or may be undertaken downstream of the beverage cartridge by passing the beverage through a suitable constriction to form a mass of fine air bubbles within the fluid flow. The variable valve 17 may be used to provide the crema generation.

What is claimed is:

1. A system for making a beverage comprising a beverage preparation machine and a beverage cartridge;

wherein the beverage cartridge comprises an extraction chamber containing roasted ground coffee having a dry Helos particle size distribution D50 of less than or equal to 200 microns; and wherein the beverage preparation machine comprises a source of an aqueous medium, a pump and a controller, the controller being programmed to pump the aqueous medium through the extraction chamber of the beverage cartridge at a flow rate of 0.5 to 5 ml/s and at a temperature of 1° C. to 40° C. to form the beverage.

2. The system of claim 1 wherein the roasted ground coffee in the beverage cartridge has a dry Helos particle size distribution D50 of less than or equal to 150 microns.

3. The system of claim 1 wherein the roasted ground coffee in the beverage cartridge has a dry Helos particle size distribution D50 of less than or equal to 100 microns.

4. The system of claim 1 wherein the aqueous medium is pumped at a temperature of 1° C. to 25° C.

5. The system of claim 1 wherein the aqueous medium is pumped at a temperature of 15° C. to 25° C.

6. The system of claim 1 wherein the aqueous medium is pumped at a temperature of 20° C. to 25° C.

7. The system of claim 1 wherein the aqueous medium is pumped at a flow rate of 1 to 3 ml/s.

8. The system of claim 1 wherein the aqueous medium is pumped at a flow rate of approximately 2 ml/s.

9. The system of claim 1 wherein the quantity of roasted ground coffee in the extraction chamber is 9 g or greater.

10. The system of claim 1 wherein the quantity of roasted ground coffee in the extraction chamber is 9 g to 13 g.

11. The system of claim 1 wherein the quantity of roasted ground coffee in the extraction chamber is 10 g to 13 g.

12. The system of claim 1 wherein the fill ratio of the extraction chamber is greater than 80%.

13. The system of claim 1 wherein the fill ratio of the extraction chamber is greater than 100%.

14. The system of claim 1 wherein the fill ratio of the extraction chamber is 80% to 150%.

15. The system of claim 1 wherein the beverage preparation machine comprises a valve for setting an extraction pressure experienced during extraction in the extraction chamber of the beverage cartridge and wherein the controller is programmed to operate the valve to set the extraction pressure at 4 to 20 bar.

16. The system of claim 15 wherein the valve is located downstream of the beverage cartridge.

17. A beverage cartridge for use in a beverage preparation machine comprising an extraction chamber containing 9 g or greater of roasted ground coffee having a dry Helos particle size distribution D50 of less than or equal to 200 microns and further comprising a code readable by the beverage preparation machine, wherein the code instructs the controller of the beverage preparation machine to pump an aqueous medium through the extraction chamber of the beverage cartridge at a flow rate of 0.5 to 5 ml/s and at a temperature of 1° C. to 40° C. to form a beverage.

* * * * *